(12) United States Patent
Koeppel et al.

(10) Patent No.: US 10,663,410 B2
(45) Date of Patent: May 26, 2020

(54) METHOD AND SYSTEM FOR DETERMINING A PERMITTIVITY OF A SUBSTANCE LAYER

(71) Applicant: Rohde & Schwarz GmbH & Co. KG, Munich (DE)

(72) Inventors: Tobias Koeppel, Munich (DE); Frank Gumbmann, Nuremberg (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/119,192

(22) Filed: Aug. 31, 2018

(65) Prior Publication Data

US 2020/0072765 A1    Mar. 5, 2020

(51) Int. Cl.
*G01N 22/00* (2006.01)
(52) U.S. Cl.
CPC .................................... *G01N 22/00* (2013.01)
(58) Field of Classification Search
CPC ........... G01N 27/048; G01N 2033/245; G01N 27/121; G01N 27/223; G01N 33/246
USPC ...... 321/71.1, 61, 65, 75, 689, 694
See application file for complete search history.

(56) References Cited

U.S. PATENT DOCUMENTS

| | | | |
|---|---|---|---|
| 3,694,742 A | 9/1972 | Bergmanis et al. | |
| 4,929,904 A * | 5/1990 | Bohman | A01D 89/006 324/694 |
| 8,093,161 B2 * | 1/2012 | Bansal | D01F 8/06 442/334 |
| 8,410,006 B2 * | 4/2013 | Chappas | B01D 39/04 428/364 |
| 9,303,342 B2 * | 4/2016 | Wang | B32B 5/08 |
| 2003/0118832 A1 * | 6/2003 | Skaling | G01N 33/246 428/412 |
| 2009/0205363 A1 * | 8/2009 | de Strulle | B08B 7/0014 62/533 |

* cited by examiner

*Primary Examiner* — Giovanni Astacio-Oquendo
(74) *Attorney, Agent, or Firm* — Ditthavong & Steiner P. C.

(57) ABSTRACT

A method for determining a permittivity of a substance layer is provided. The method comprises the steps of depositing a layer of a certain thickness of the substance on a substrate comprising at least one substrate parameter of electromagnetic relevance in order to form a sample arrangement, obtaining at least one measurement parameter of electromagnetic relevance with respect to the surface of the sample arrangement with the aid of an electromagnetic excitation signal generated by a measurement equipment, and determining the permittivity of the substance layer on the basis of the at least one measurement parameter of electromagnetic relevance.

20 Claims, 3 Drawing Sheets

METHOD AND SYSTEM FOR DETERMINING A PERMITTIVITY OF A SUBSTANCE LAYER

TECHNICAL FIELD

The invention relates to a method and a system for determining a permittivity of a substance layer.

BACKGROUND ART

Generally, in times of an increasing number of applications providing radar sensing capabilities such as autonomous vehicles, there is a growing need of a method and a system for determining a permittivity of a substance layer with respect to materials used in this radar context especially to verify correct functioning of said applications in a highly accurate and efficient manner.

U.S. Pat. No. 3,694,742 discloses a device for measuring permittivity of materials on the basis of at least two different measured capacitance values of a capacitor connected to the material being tested and to a measuring oscillator the output of which is coupled to the input of a frequency meter in the form of a series combination of a switch and a pulse counter with a resetting unit, said capacitor being formed by at least two main electrodes permanently connected to the input of said measuring oscillator, and one additional electrode which is alternately connected by a changeover switch to one of said main electrodes in the course of measurement, while said resetting unit is connected to said pulse counter in the form of a reversible counter by an on-off switch actuated synchronously with said switch of the measured capacitor electrodes, the direction of counting of said reversible counter being determined by the position of said changeover switch of the measured capacitor electrodes. As it can be seen, due to the usage of said capacitor exclusively allowing for permittivity measurements with respect to materials of a higher thickness, the use of said device in the context of permittivity determination with respect to a substance layer disadvantageously leads to no useful result or a limited accuracy, and thus also to a reduced efficiency.

Accordingly, there is a need to provide a method and a system for determining a permittivity of a substance layer, each of which ensures both a high accuracy and an increased efficiency.

SUMMARY OF THE INVENTION

According to a first aspect of the invention, a method for determining a permittivity of a substance layer is provided. The method comprises the steps of depositing a layer of a certain thickness of the substance on a substrate comprising at least one substrate parameter of electromagnetic relevance in order to form a sample arrangement, obtaining at least one measurement parameter of electromagnetic relevance with respect to the surface of the sample arrangement with the aid of an electromagnetic excitation signal generated by a measurement equipment, and determining the permittivity of the substance layer on the basis of the at least one measurement parameter of electromagnetic relevance. Advantageously, the permittivity of the substance layer can be determined in an accurate and efficient manner.

According to a first preferred implementation form of the first aspect of the invention, the at least one substrate parameter of electromagnetic relevance varies over the surface of the sample arrangement in order to obtain a corresponding measurement parameter set of electromagnetic relevance. Advantageously, the permittivity of the substance layer can be recovered from the corresponding refection coefficient that is changing over the surface of the sample arrangement.

According to a second preferred implementation form of the first aspect of the invention, the method further comprises the step of modelling a data set of best fit for the corresponding measurement parameter set of electromagnetic relevance with respect to the permittivity of the substance layer. Advantageously, both accuracy and efficiency can further be increased.

According to a further preferred implementation form of the first aspect of the invention, the at least one substrate parameter of electromagnetic relevance comprises with respect to the substrate, at least one of permittivity, thickness, permeability, phase constant, transformed free space impedance, impedance, roughness, or any combination thereof. Advantageously, for instance, complexity can be reduced, thereby increasing efficiency.

According to a further preferred implementation form of the first aspect of the invention, the at least one measurement parameter of electromagnetic relevance comprises with respect to the surface of the sample arrangement, a measured impedance and/or a measured reflection coefficient. Advantageously, measurements can be performed in a simple manner, thereby further increasing efficiency.

According to a further preferred implementation form of the first aspect of the invention, the measurement equipment comprises an electromagnetic imaging system. In addition to this or as an alternative, the measurement equipment comprises a network analyzer, preferably a vector network analyzer. Advantageously, complexity can further be reduced, which leads to an increased efficiency.

According to a further preferred implementation form of the first aspect of the invention, the method further comprises the step of correcting attenuation and/or phase with respect to free space propagation from the measurement equipment to the sample arrangement with the aid of a reference arrangement. Advantageously, accuracy can further be increased.

According to a further preferred implementation form of the first aspect of the invention, the reference arrangement comprises at least one metal stripe. In addition to this or as an alternative, the reference arrangement comprises at least one metal plate. Advantageously, complexity can further be reduced.

According to a further preferred implementation form of the first aspect of the invention, the method further comprises the step of correcting at least one tilt angle of the sample arrangement with respect to the measurement equipment with the aid of the phase response of the reference arrangement over the sample arrangement area. Advantageously, in this manner, accuracy can further be increased.

According to a further preferred implementation form of the first aspect of the invention, the at least one substrate parameter of electromagnetic relevance comprises the permittivity of the substrate $\varepsilon_{substrate}$, wherein the method further comprises the step of calculating the phase constant of the substrate $\beta_{substrate}$ with the aid of the following equation:

$$\beta_{substrate} = \frac{2\pi}{\lambda} \sqrt{\varepsilon_{substrate}},$$

wherein λ is the wavelength of the electromagnetic excitation signal.

According to a further preferred implementation form of the first aspect of the invention, the at least one substrate parameter of electromagnetic relevance comprises the permittivity of the substrate $\varepsilon_{substrate}$, wherein the method further comprises the step of calculating the impedance of the substrate $Z_{substrate}$ with the aid of the following equation:

$$Z_{substrate} = \frac{Z_0}{\sqrt{\varepsilon_{substrate}}},$$

wherein $Z_0$ is the impedance of free space.

According to a further preferred implementation form of the first aspect of the invention, the at least one substrate parameter of electromagnetic relevance further comprises the thickness of the substrate $d_{substrate}$, the impedance of the substrate $Z_{substrate}$, and the transformed free space impedance over the substrate $Z_{trans,sub}$, wherein the method further comprises the step of calculating the impedance of the substrate with the aid of the following equation:

$$Z_{substrate} = \frac{Z_0}{\sqrt{\varepsilon_{substrate}}},$$

wherein $Z_0$ is the impedance of free space.

In this context, the method further comprises the step of calculating the transformed free space impedance over the substrate with the aid of the following equation:

$$Z_{trans,sub} = \frac{Z_0 + jZ_{substrate}\tan(\beta_{substrate}d_{substrate})}{Z_{substrate} + jZ_0\tan(\beta_{substrate}d_{substrate})},$$

wherein j is the imaginary number.

According to a further preferred implementation form of the first aspect of the invention, the at least one measurement parameter of electromagnetic relevance comprises with respect to the surface of the sample arrangement, a measured reflection coefficient $r_m$, wherein the method further comprises the step of calculating the corresponding impedance $Z_m$ by solving the following equation for $Z_m$:

$$r_m = \frac{Z_m - Z_0}{Z_m + Z_0},$$

wherein $Z_0$ is the impedance of free space.

According to a further preferred implementation form of the first aspect of the invention, the method further comprises the step of calculating the permittivity of the substance layer $\varepsilon_{layer}$ by solving the following equation for $\varepsilon_{layer}$:

$$Z_m = \frac{Z_{trans,sub} + j\frac{Z_0}{\sqrt{\varepsilon_{layer}}}\tan\left(\frac{2\pi}{\lambda}d_{layer}\sqrt{\varepsilon_{layer}}\right)}{\frac{Z_0}{\sqrt{\varepsilon_{layer}}} + jZ_{trans,sub}\tan\left(\frac{2\pi}{\lambda}d_{layer}\sqrt{\varepsilon_{layer}}\right)},$$

wherein j is the imaginary number,
wherein $Z_0$ is the impedance of free space,
wherein λ is the wavelength of the electromagnetic excitation signal,
wherein $d_{layer}$ is the certain thickness of the substance layer, and
wherein $Z_{trans,sub}$ is the transformed free space impedance over the substrate being defined as $$Z_{trans,sub} = \frac{Z_0 + jZ_{substrate}\tan(\beta_{substrate}d_{substrate})}{Z_{substrate} + jZ_0\tan(\beta_{substrate}d_{substrate})},$$

wherein $Z_{substrate}$ is the impedance of the substrate being defined as $$Z_{substrate} = \frac{Z_0}{\sqrt{\varepsilon_{substrate}}},$$

wherein $\varepsilon_{substrate}$ is the permittivity of the substrate,
wherein $\beta_{substrate}$ is the phase constant of the substrate being defined as $$\beta_{substrate} = \frac{2\pi}{\lambda}\sqrt{\varepsilon_{substrate}},$$

and
wherein $d_{substrate}$ is the thickness of the substrate.

Advantageously, such a calculation can be done in an accurate and efficient manner.

According to a further preferred implementation form of the first aspect of the invention, the substance layer comprises a paint, a coating, a primer, or any combination thereof. Advantageously, the permittivity of very thin layers can be determined in an accurate and efficient manner.

According to a second aspect of the invention, a system for determining a permittivity of a substance layer is provided. The system comprises a precipitator configured to deposit a layer of a certain thickness of the substance on a substrate comprising at least one substrate parameter of electromagnetic relevance in order to form a sample arrangement, and a measurement equipment configured to obtain at least one measurement parameter of electromagnetic relevance with respect to the surface of the sample arrangement with the aid of an electromagnetic excitation signal. In this context, the measurement equipment is further configured to determine the permittivity of the substance layer on the basis of the at least one measurement parameter of electromagnetic relevance. Advantageously, the permittivity of the substance layer can be determined in an accurate and efficient manner.

According to a first preferred implementation form of the second aspect of the invention, at least one substrate parameter of electromagnetic relevance varies over the surface of the sample arrangement in order to obtain a corresponding measurement parameter set of electromagnetic relevance. Advantageously, the permittivity of the substance layer can be recovered from the corresponding refection coefficient that is changing over the surface of the sample arrangement.

According to a second preferred implementation form of the second aspect of the invention, the measurement equipment is further configured to model a data set of best fit for the corresponding measurement parameter set of electromagnetic relevance with respect to the permittivity of the substance layer. Advantageously, both accuracy and efficiency can further be increased.

According to a further preferred implementation form of the second aspect of the invention, the at least one substrate parameter of electromagnetic relevance comprises with respect to the substrate, at least one of permittivity, thickness, permeability, phase constant, transformed free space impedance, impedance, roughness, or any combination thereof. Advantageously, for instance, complexity can be reduced, thereby increasing efficiency.

According to a further preferred implementation form of the second aspect of the invention, the at least one measurement parameter of electromagnetic relevance comprises with respect to the surface of the sample arrangement, a measured impedance and/or a measured reflection coefficient. Advantageously, measurements can be performed in a simple manner, thereby further increasing efficiency.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
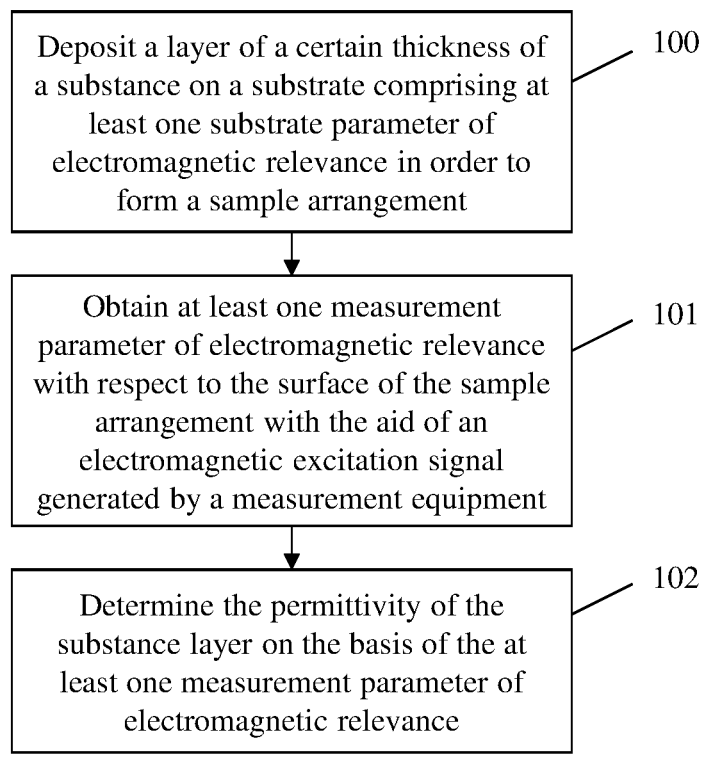
FIG. 1 shows a flow chart of an exemplary embodiment of the first aspect of the invention.

Firstly, FIG. 1 shows a flow chart of an exemplary embodiment of the inventive method for determining a permittivity of a substance layer. In a first step 100, a layer of a certain thickness of the substance is deposited on a substrate comprising at least one substrate parameter of electromagnetic relevance in order to form a sample arrangement. Then, in a second step 101, at least one measurement parameter of electromagnetic relevance with respect to the surface of the sample arrangement is obtained with the aid of an electromagnetic excitation signal generated by a measurement equipment. Furthermore, according to a third step 102, the permittivity of the substance layer is determined on the basis of the at least one measurement parameter of electromagnetic relevance.

Figure 2:
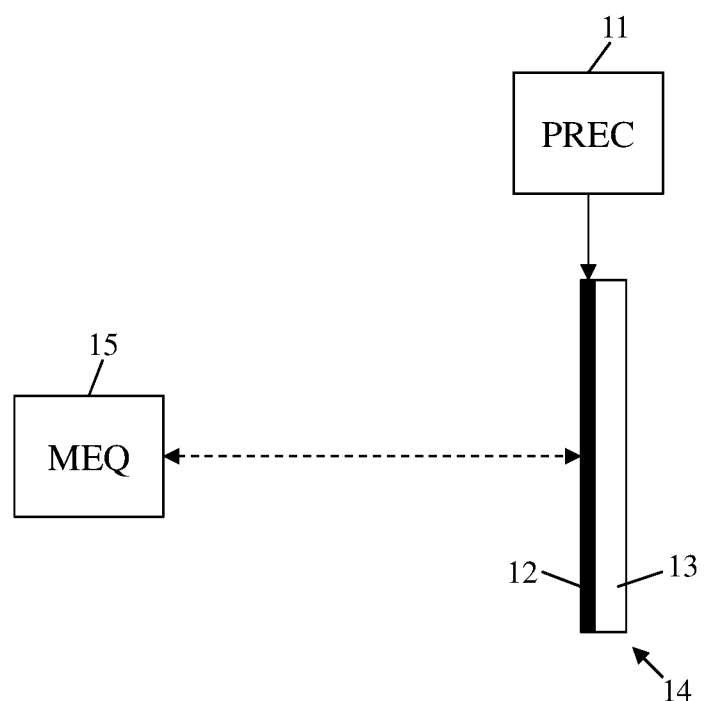
FIG. 2 shows an exemplary embodiment of the of the second aspect of the invention.

Furthermore, an exemplary embodiment of an inventive system for determining a permittivity of a substance layer is illustrated by FIG. 2. The system comprises a precipitator 11 depositing a layer 12 of a certain thickness of the substance on a substrate 13 comprising at least one substrate parameter of electromagnetic relevance in order to form a sample arrangement 14, and a measurement equipment obtaining at least one measurement parameter of electromagnetic relevance with respect to the surface of the sample arrangement 14 with the aid of an electromagnetic excitation signal.

In addition to this, the measurement equipment 15 determines the permittivity of the substance layer 12 on the basis of the at least one measurement parameter of electromagnetic relevance.

With respect to the substance layer 12, it is noted that the substance layer 12 may preferably comprise a paint, a coating, a primer, or any combination thereof.

Moreover, it might be particularly advantageous if the at least one substrate parameter of electromagnetic relevance varies over the surface of the sample arrangement 14 in order to obtain a corresponding measurement parameter set of electromagnetic relevance.

Additionally, the measurement equipment may further model a data set of best fit for the corresponding measurement parameter set of electromagnetic relevance with respect to the permittivity of the substance layer 12.

It is further noted that the at least one substrate parameter of electromagnetic relevance may especially comprise with respect to the substrate 13, at least one of permittivity, thickness, permeability, phase constant, transformed free space impedance, impedance, roughness, or any combination thereof.

In addition to this, the at least one measurement parameter of electromagnetic relevance may preferably comprise with respect to the surface of the sample arrangement 14, a measured impedance. Additionally or alternatively, the at least one measurement parameter of electromagnetic relevance may especially comprise a measured reflection coefficient.

With respect to the measurement equipment 15, it should be mentioned that the measurement equipment 15 may especially comprise an electromagnetic imaging system and/or a network analyzer, preferably a vector network analyzer.

It might be particularly advantageous if the measurement equipment 15 may preferably correct attenuation and/or phase with respect to free space propagation from the measurement equipment 15 to the sample arrangement 14 with the aid of a reference arrangement.

With respect to said reference arrangement, it is noted that the reference arrangement may especially comprise at least one metal stripe and/or at least one metal plate.

Further advantageously, the measurement equipment 15 may especially correct at least one tilt angle of the sample arrangement 14 with respect to the measurement equipment 15 with the aid of the phase response of the reference arrangement over the sample arrangement area.

Moreover, especially in the case that the at least one substrate parameter of electromagnetic relevance comprises the permittivity $\varepsilon_{substrate}$ of the substrate 13, the measurement equipment 15 may preferably calculate the phase constant $\beta_{substrate}$ of the substrate 13 with the aid of the following equation:

$$\beta_{substrate} = \frac{2\pi}{\lambda}\sqrt{\varepsilon_{substrate}}, \quad (1)$$

wherein $\lambda$ is the wavelength of the electromagnetic excitation signal.

In addition to this or as an alternative, the measurement equipment 15 may preferably calculate the impedance $Z_{substrate}$ of the substrate 13 with the aid of the following equation:

$$Z_{substrate} = \frac{Z_0}{\sqrt{\varepsilon_{substrate}}}, \quad (2)$$

wherein $Z_0$ is the impedance of free space.

Further additionally or alternatively, especially in the case that the at least one substrate parameter of electromagnetic relevance further comprises the thickness $d_{substrate}$ of the substrate 13, the impedance $Z_{substrate}$ of the substrate 13, and the transformed free space impedance $Z_{trans,sub}$ over the substrate 13, the measurement equipment 15 may preferably calculate said transformed free space impedance $Z_{trans,sub}$ over the substrate 13 with the aid of the following equation:

$$Z_{trans,sub} = \frac{Z_0 + jZ_{substrate}\tan(\beta_{substrate}d_{substrate})}{Z_{substrate} + jZ_0\tan(\beta_{substrate}d_{substrate})}, \quad (3)$$

wherein j is the imaginary number.

Furthermore, especially in the case that the at least one measurement parameter of electromagnetic relevance comprises with respect to the surface of the sample arrangement 14, a measured reflection coefficient $r_m$, the measurement equipment 15 may preferably calculate the corresponding impedance $Z_m$ by solving the following equation for $Z_m$:

$$r_m = \frac{Z_m - Z_0}{Z_m + Z_0}. \quad (4)$$

In further addition to this or as a further alternative, the measurement equipment 15 may preferably calculate the permittivity $\varepsilon_{layer}$ of the substance layer 12 by solving the following equation for $\varepsilon_{layer}$:

$$Z_m = \frac{Z_{trans,sub} + j\frac{Z_0}{\sqrt{\varepsilon_{layer}}}\tan\left(\frac{2\pi}{\lambda}d_{layer}\sqrt{\varepsilon_{layer}}\right)}{\frac{Z_0}{\sqrt{\varepsilon_{layer}}} + jZ_{trans,sub}\tan\left(\frac{2\pi}{\lambda}d_{layer}\sqrt{\varepsilon_{layer}}\right)}, \quad (5)$$

wherein $d_{layer}$ is the certain thickness of the substance layer 12.

In this context, it is noted that $$\frac{Z_0}{\sqrt{\varepsilon_{layer}}}$$

can be written as $Z_{layer}$, which leads to the following equation:

$$Z_{layer} = \frac{Z_0}{\sqrt{\varepsilon_{layer}}}, \quad (6)$$

wherein $Z_{layer}$ is the impedance of the substance layer 12.

It is further noted that $$\frac{2\pi}{\lambda}\sqrt{\varepsilon_{layer}}$$

might be written as $\beta_{layer}$, which leads to the following equation:

$$\beta_{layer} = \frac{2\pi}{\lambda}\sqrt{\varepsilon_{layer}}, \quad (7)$$

wherein $\beta_{layer}$ is the phase constant of the substance layer 12.

Figure 3:
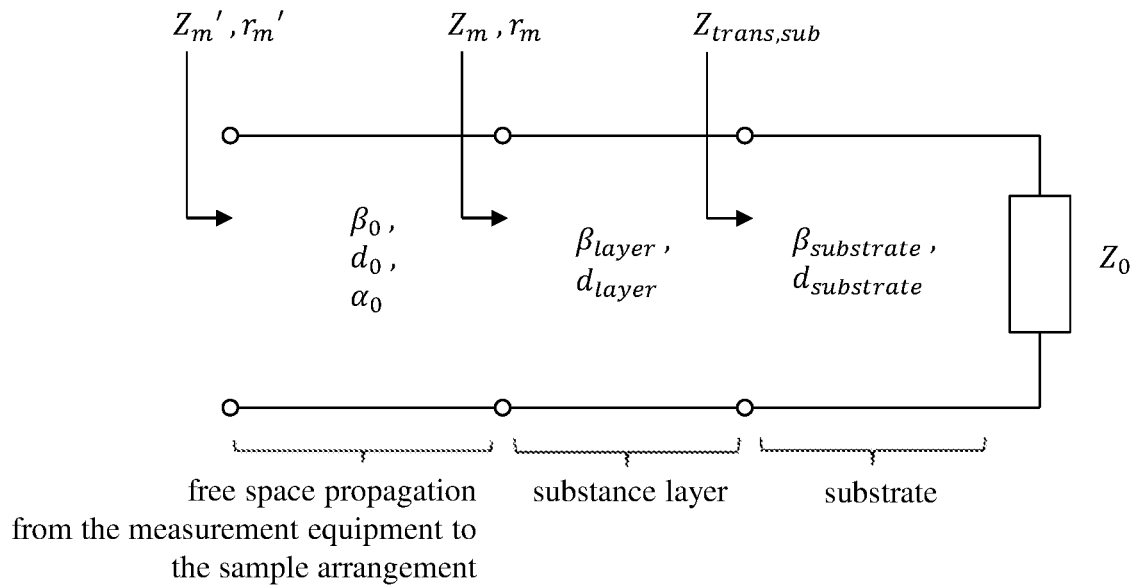
FIG. 3 shows an exemplary embodiment of an equivalent circuit diagram with respect to the sample arrangement.

Now, with respect to FIG. 3, an exemplary embodiment of an equivalent circuit diagram with respect to the sample arrangement, especially an extended model of said equivalent circuit diagram, is shown.

In this context, account is taken of the fact that the beam transmitted by the measurement equipment has to propagate through free space before arriving at the sample arrangement for distance $d_0$. Furthermore, at the sample arrangement, the beam has especially been attenuated mainly by free space path loss $\alpha_0$. In addition to this, the beam has especially experienced a change in phase due to the distance travelled, which can be expressed by the phase constant $\beta_0$ of the free space, wherein for $\beta_0$ the following equation applies:

$$\beta_0 = \frac{2\pi}{\lambda}. \quad (8)$$

Whereas the most of the parameters shown in FIG. 3 have already been explained above, it is noted that $Z_m'$ represents the unreferenced measured impedance and $r_m'$ represents the unreferenced measured reflection coefficient.

Figure 4:
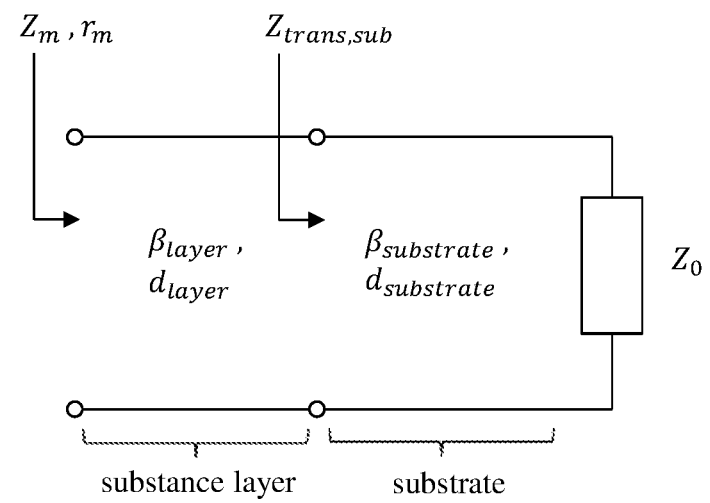
FIG. 4 shows an exemplary embodiment of a simplified equivalent circuit diagram with respect to the sample arrangement.

It is further noted that said extended model can be reduced to the equivalent circuit diagram according to FIG. 4, wherein the parameters with special respect to the free space propagation from the measurement equipment to the sample arrangement have been eliminated.

In this context, both the unknown attenuation and phase are corrected with the aid of the reference arrangement, which has already been explained above and may preferably comprise at least one metal stripe or plate, on the sample arrangement.

With respect to each of the equivalent circuit diagram according to FIG. 3 and the equivalent circuit diagram of FIG. 4, it is noted that if some parameters are unknown, said unknown parameters may preferably be estimated.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for determining a permittivity of a substance layer, the method comprising the steps of:

depositing, by way of a precipitator, a layer of a certain thickness of the substance on a substrate comprising at least one substrate parameter of electromagnetic relevance in order to form a sample arrangement, obtaining at least one measurement parameter of electromagnetic relevance with respect to the surface of the sample arrangement with the aid of an electromagnetic excitation signal generated by a measurement equipment, determining the permittivity of the substance layer on the basis of the at least one measurement parameter of electromagnetic relevance, and correcting attenuation and/or phase with respect to free space propagation from the measurement equipment to the sample arrangement.

2. The method according to claim 1, wherein the at least one substrate parameter of electromagnetic relevance varies over the surface of the sample arrangement in order to obtain a corresponding measurement parameter set of electromagnetic relevance.

3. The method according to claim 2, wherein the method further comprises the step of modelling a data set of best fit for the corresponding measurement parameter set of electromagnetic relevance with respect to the permittivity of the substance layer.

4. The method according to claim 1, wherein the at least one substrate parameter of electromagnetic relevance comprises with respect to the substrate, at least one of permittivity, thickness, permeability, phase constant, transformed free space impedance, impedance, roughness, or any combination thereof.

5. The method according to claim 1, wherein the at least one measurement parameter of electromagnetic relevance comprises with respect to the surface of the sample arrangement, a measured impedance and/or a measured reflection coefficient.

6. The method according to claim 1, wherein the measurement equipment comprises an electromagnetic imaging system and/or a network analyzer, preferably a vector network analyzer.

7. The method according to claim 1, wherein the step of correcting attenuation and/or phase with respect to free space propagation from the measurement equipment to the sample arrangement is performed with the aid of a reference arrangement.

8. The method according to claim 7, wherein the reference arrangement comprises at least one metal stripe and/or at least one metal plate.

9. The method according to claim 7, wherein the method further comprises the step of correcting at least one tilt angle of the sample arrangement with respect to the measurement equipment with the aid of the phase response of the reference arrangement over the sample arrangement area.

10. The method according to claim 1, wherein the at least one substrate parameter of electromagnetic relevance comprises the permittivity of the substrate $\varepsilon_{substrate}$, wherein the method further comprises the step of calculating the phase constant of the substrate $\beta_{substrate}$ with the aid of the following equation:

$$\beta_{substrate} = \frac{2\pi}{\lambda}\sqrt{\varepsilon_{substrate}},$$

wherein $\lambda$ is the wavelength of the electromagnetic excitation signal.

11. The method according to claim 10, wherein the at least one substrate parameter of electromagnetic relevance further comprises the thickness of the substrate $d_{substrate}$, the impedance of the substrate $Z_{substrate}$, and the transformed free space impedance over the substrate $Z_{trans,sub}$, wherein the method further comprises the step of calculating the impedance of the substrate with the aid of the following equation:

$$Z_{substrate} = \frac{Z_0}{\sqrt{\varepsilon_{substrate}}},$$

wherein $Z_0$ is the impedance of free space, and wherein the method further comprises the step of calculating the transformed free space impedance over the substrate with the aid of the following equation:

$$Z_{trans,sub} = \frac{Z_0 + jZ_{substrate}\tan(\beta_{substrate}d_{substrate})}{Z_{substrate} + jZ_0\tan(\beta_{substrate}d_{susbtrate})},$$

wherein j is the imaginary number.

12. The method according to claim 1, wherein the at least one substrate parameter of electromagnetic relevance comprises the permittivity of the substrate $\varepsilon_{substrate}$, wherein the method further comprises the step of calculating the impedance of the substrate $Z_{substrate}$, with the aid of the following equation:

$$Z_{substrate} = \frac{Z_0}{\sqrt{\varepsilon_{substrate}}},$$

wherein $Z_0$ is the impedance of free space.

13. The method according to claim 1, wherein the at least one measurement parameter of electromagnetic relevance comprises with respect to the surface of the sample arrangement, a measured reflection coefficient $r_m$, wherein the method further comprises the step of calculating the corresponding impedance $Z_m$ by solving the following equation for $Z_m$:

$$r_m = \frac{Z_m - Z_0}{Z_m + Z_0},$$

wherein $Z_0$ is the impedance of free space.

14. The method according to claim 13, wherein the method further comprises the step of calculating the permittivity of the substance layer $\varepsilon_{layer}$ by solving the following equation for $\varepsilon_{layer}$:

$$Z_m = \frac{Z_{trans,sub} + j\frac{Z_0}{\sqrt{\varepsilon_{layer}}}\tan\left(\frac{2\pi}{\lambda}d_{layer}\sqrt{\varepsilon_{layer}}\right)}{\frac{Z_0}{\sqrt{\varepsilon_{layer}}} + jZ_{trans,sub}\tan\left(\frac{2\pi}{\lambda}d_{layer}\sqrt{\varepsilon_{layer}}\right)},$$

wherein f is the imaginary number,
wherein $Z_0$ is the impedance of free space,
wherein $\lambda$ is the wavelength of the electromagnetic excitation signal,
wherein $d_{layer}$ is the certain thickness of the substance layer, and
wherein $Z_{trans,sub}$ is the transformed free space impedance over the substrate being defined as $$Z_{trans,sub} = \frac{Z_0 + jZ_{substrate}\tan(\beta_{substrate}d_{substrate})}{Z_{substrate} + jZ_0\tan(\beta_{substrate}d_{susbtrate})},$$

wherein $Z_{substrate}$ is the impedance of the substrate being defined as $$Z_{substrate} = \frac{Z_0}{\sqrt{\varepsilon_{substrate}}},$$

wherein $\varepsilon_{substrate}$ is the permittivity of the substrate,
wherein $\beta_{substrate}$ is the phase constant of the substrate being defined as $$\beta_{substrate} = \frac{2\pi}{\lambda}\sqrt{\varepsilon_{substrate}},$$

and
wherein $d_{substrate}$ is the thickness of the substrate.

15. The method according to claim 1,
wherein the substance layer comprises a paint, a coating, a primer, or any combination thereof.

16. A system for determining a permittivity of a substance layer, the system comprising:
a precipitator configured to deposit a layer of a certain thickness of the substance on a substrate comprising at least one substrate parameter of electromagnetic relevance in order to form a sample arrangement, and
a measurement equipment configured to obtain at least one measurement parameter of electromagnetic relevance with respect to the surface of the sample arrangement with the aid of an electromagnetic excitation signal,
wherein the measurement equipment is further configured to determine the permittivity of the substance layer on the basis of the at least one measurement parameter of electromagnetic relevance.

17. The system according to claim 16,
wherein the at least one substrate parameter of electromagnetic relevance varies over the surface of the sample arrangement in order to obtain a corresponding measurement parameter set of electromagnetic relevance.

18. The system according to claim 17,
wherein the measurement equipment is further configured to model a data set of best fit for the corresponding measurement parameter set of electromagnetic relevance with respect to the permittivity of the substance layer.

19. The system according to claim 16,
wherein the at least one substrate parameter of electromagnetic relevance comprises with respect to the substrate, at least one of permittivity, thickness, permeability, phase constant, transformed free space impedance, impedance, roughness, or any combination thereof.

20. The system according to claim 16,
wherein the at least one measurement parameter of electromagnetic relevance comprises with respect to the surface of the sample arrangement, a measured impedance and/or a measured reflection coefficient.

* * * * *